(12) United States Patent
Mookanahallipatna Ramasesha et al.

(10) Patent No.: US 10,571,603 B2
(45) Date of Patent: Feb. 25, 2020

(54) METHOD IMPLEMENTED IN A COMPUTER FOR THE NUMERICAL SIMULATION OF A POROUS MEDIUM

(71) Applicants: REPSOL, S.A., Madrid (ES); UNIVERSIDAD POLITÉCNICA DE CATALUÑA, Barcelona (ES)

(72) Inventors: Lakshmikantha Mookanahallipatna Ramasesha, Madrid (ES); José María Segura Serra, Madrid (ES); Jose Alvarellos Iglesias, Madrid (ES); Ignacio Carol Vilarasau, Barcelona (ES); Pere Prat Catalan, Barcelona (ES); Ignasi Aliguer Piferrer, Barcelona (ES); Daniel Garolera Vinent, Barcelona (ES)

(73) Assignees: REPSOL, S.A., Madrid (ES); UNIVERSIDAD POLITÉCNICA DE CATALUÑA, Barcelona (ES)

(*) Notice: Subject to any disclaimer, the term of this patent is extended or adjusted under 35 U.S.C. 154(b) by 294 days.

(21) Appl. No.: 15/120,266

(22) PCT Filed: Feb. 18, 2015

(86) PCT No.: PCT/EP2015/053423
§ 371 (c)(1),
(2) Date: Aug. 19, 2016

(87) PCT Pub. No.: WO2015/124633
PCT Pub. Date: Aug. 27, 2015

(65) Prior Publication Data
US 2017/0059742 A1    Mar. 2, 2017

(30) Foreign Application Priority Data
Feb. 19, 2014  (EP) .................................. 14382056

(51) Int. Cl.
*G01V 99/00* (2009.01)
*E21B 43/00* (2006.01)
(Continued)

(52) U.S. Cl.
CPC ........ *G01V 99/005* (2013.01); *E21B 41/0092* (2013.01); *E21B 43/00* (2013.01);
(Continued)

(58) Field of Classification Search
CPC ....... G01V 99/005; G06F 17/16; G06F 17/13; E21B 43/26; E21B 41/0092; E21B 43/00
See application file for complete search history.

(56) References Cited

U.S. PATENT DOCUMENTS

| 9,361,414 B2 * | 6/2016 | Mustapha | ........... G06F 17/5018 |
| 2010/0076738 A1 * | 3/2010 | Dean | ....................... E21B 43/26 703/7 |

(Continued)

FOREIGN PATENT DOCUMENTS

| WO | 2009029133 A1 | 3/2009 |
| WO | 2009029135 A1 | 3/2009 |

OTHER PUBLICATIONS

Segura et al. "Coupled HM analysis using zero-thickness interface elements with double nodes. Part I: Theoretical model" Intnl Jrnl for Numerical and Analytical Methods in Geomechanics, pp. 2083-2101 [retrieved on Jul. 30, 2018]. Retrieved from <https://onlinelibrary.wiley.com/doi/pdf/10.1002/nag.735> (Year: 2008).*
(Continued)

*Primary Examiner* — Rehana Perveen
*Assistant Examiner* — Alfred H B Wechselberger
(74) *Attorney, Agent, or Firm* — Reising Ethington, P.C.

(57) ABSTRACT

The object of the invention is a method implemented in a computer for the numerical simulation of a porous medium that may comprise multiple interacting hydraulic fractures in
(Continued)

continuous or naturally fractured medium. The method calculates numerically the propagation of a crack, or set of cracks, for instance under the fluid pressure imposed artificially through a well or perforation in a rock mass. This is accomplished by using the Finite Element Method and the special elements named zero-thickness interface or joint elements in the specialized literature, which are pre-inserted along all potential crack paths in the rock mass (pre-existing natural and artificial fractures plus main potential new fracture paths).

12 Claims, 11 Drawing Sheets

(51) Int. Cl.
    *E21B 41/00*      (2006.01)
    *E21B 43/26*      (2006.01)
    *G06F 17/13*      (2006.01)
    *G06F 17/16*      (2006.01)

(52) U.S. Cl.
    CPC .............. *E21B 43/26* (2013.01); *G06F 17/13* (2013.01); *G06F 17/16* (2013.01)

(56) References Cited

U.S. PATENT DOCUMENTS

| | | | |
|---|---|---|---|
| 2012/0035896 A1 | 2/2012 | Wu et al. | |
| 2013/0332129 A1* | 12/2013 | Xia | G06F 17/5018 703/9 |
| 2014/0222393 A1* | 8/2014 | Bai | G06F 17/5009 703/2 |
| 2016/0040531 A1* | 2/2016 | Ramakrishnan | G01V 1/50 702/8 |
| 2016/0341850 A1* | 11/2016 | Lin | E21B 41/0092 |

OTHER PUBLICATIONS

Watanabe et al. "Lower-dimensional interface elements with local enrichment: application to coupled hydro-mechanical problems" (abbr) Intnl Journal for Numerical Methods in Eng vol. 90, pp. 1010-1034 [retrieved on Jul. 30, 2018]. Retrieved from <https://onlinelibrary.wiley.com/doi/pdf/10.1002/nme.3353> (Year: 2012).*

Jing, L. "A review of techniques, advances and outstanding issues in numerical modelling" (abbreviated) Intnl Journal of Rock Mechanics and Mining Sciences vol. 40, pp. 283-353 [retrieved on Jul. 30, 2018]. Retrieved from <https://www.sciencedirect.com/science/article/pii/S1365160903000133> (Year: 2003).*

Carrier et al. "Numerical modeling of hydraulic fracture problem in permeable medium using cohesive zone model" HAL archives-ouvertes.fr: HAL Id: hal-00670787 [retrieved on Jul. 30, 2018]. Retrieved from <https://hal.archives-ouvertes.fr/hal-00670787/document> (Year: 2012).*

Merriam-Webster (delimit). Merriam-webster.com [retrieved on Apr. 25, 2019]. Retrieved from <https://www.merriam-webster.com/dictionary/delimit> (Year: 2019).*

Wikipedia contibutors. "Types of mesh". Wikipedia, The Free Encyclopedia, Mar. 2019 [retrieved on Apr. 25, 2019]. Retrieved from <https://en.wikipedia.org/wiki/Types_of_mesh> (Year: 2019).*

Merriam-Webster (contour). Merriam-webster.com [retrieved on Apr. 25, 2019]. Retrieved from <https://www.merriam-webster.com/dictionary/contour> (Year: 2019).*

Blessent et al. "Coupling geological and numerical models to simulate groundwater flow and contaminant transport in fractured media" Computers and Geosciences, vol. 35, pp. 1897-1906 [retrieved on Apr. 24, 2019]. Retrieved from <https://www.sciencedirect.com/science/article/pii/S0098300409001174> (Year: 2009).*

Zavattieri et al. "Grain Level Analysis of Crack Initiation and Propagation in Brittle Materials" Acta Materialia, vol. 49, pp. 4291-4311 [retrieved on Apr. 24, 2019]. Retrieved from <https://www.sciencedirect.com/science/article/pii/S1359645401002920> (Year: 2001).*

Bishop et al. "A Finite-Element Method for Modeling Fluid-Pressure Induced Discrete-Fracture Propagation using Random Meshes" ARMA 12-190, 46th US Rock Mechanics/Geomechanics Symposium, Chicago [retrieved on Apr. 24, 2019]. Retrieved from <https://www.onepetro.org/conference-paper/ARMA-2012-190> (Year: 2012).*

Desai et al. "Solid, Structure and Soil-Structure Interaction" [notes] Application of Finite Element and Constitutive Models, Tucson, AZ [retrieved on Oct. 28, 2019]. Retrieved from <http://events.iitgn.ac.in/2013/fem-course/handouts/Notes%20of%20Dr.%20Desai.pdf> (Year: 2012).*

Gray et al. "Overview of continuum and particle dynamics methods for mechanical modeling of contractional geologic structures" Journal of Structural Geology, vol. 59, pp. 19-36 [retrieved on Oct. 28, 2019]. Retrieved from <https://www.sciencedirect.com/science/article/pii/S0191814113002125> (Year: 2014).*

Aziz Khan: "Numerical modeling of rack joints and fractures", Society of Petroleum Engineers, SPE, Jan. 1, 1995, pp. 1183-1189. International Search Report for PCT/EP2015/053423 dated May 26, 2015, 4 pages.

* cited by examiner

|  | Mechanical conditions | Hydraulic conditions |
|---|---|---|
| STEP 1 – Insitu conditions | $\Delta\sigma$ | $\Delta p = 0.0$ |
| STEP 2 – fracture job | $\Delta\sigma$ | $Q = 0.001\ m^3/s$, $\Delta p = 0.0$ |

FIG. 8a  FIG. 8b

METHOD IMPLEMENTED IN A COMPUTER FOR THE NUMERICAL SIMULATION OF A POROUS MEDIUM

RELATED APPLICATION

This application is the National Stage of International Patent Application No. PCT/EP2015/053423, filed on Feb. 18, 2015, which claims priority to and all the advantages of European Patent Application No. EP14382056.1, filed Feb. 19, 2014.

OBJECT OF THE INVENTION

The object of the invention is a method implemented in a computer for the numerical simulation of a porous medium that may comprise a single or multiple interacting hydraulic fractures in continuous or naturally fractured media. The method calculates numerically the propagation of a crack, or set of cracks, for instance under the fluid pressure imposed artificially through a well or perforation in a rock mass.

This is accomplished by using the Finite Element Method and the special elements named zero-thickness interface or joint elements in the specialized literature, which are pre-inserted along all potential crack paths in the rock mass (pre-existing natural and artificial fractures plus main potential new fracture paths).

BACKGROUND OF THE INVENTION

Zero-thickness joint/interface elements of the Goodman type, have been advantageously used to solve many problems in solid mechanics involving material interfaces or discontinuities.

These elements are inserted in between standard elements to allow jumps in the solution field, their kinematic constitutive ("strain-type") variables are relative displacements, and the corresponding static ("stress-type") variables are stress tractions.

In particular, these elements have been used for representing rock joints in the context of rock masses, contacts between soil and steel reinforcement in reinforced earth structures, or cracks in concrete or other quasi-brittle materials, etc.

Each application may require different constitutive laws, either frictional-type or fracture-based with elasto-plastic structure.

Numerical modeling of Hydraulic Fracture (HF), on the other hand, poses considerable challenge due to the discontinuous nature of fracture, and to the strong coupling between the equations that govern the movement (momentum balance) and the equations that control the fluid pressure (fluid mass continuity). The coupling is due to the mutual influence between fluid and mechanical behavior: on the one side the fluid pressure produces deformations, and on the other side the deformations modify fluid properties (conductivities and storage capacities).

Numerical methods disclosed in the prior art simulate preexisting fracture paths and are not able to predict the fracture opening or fracture branching.

The present invention provides a numerical method allowing the skilled person to simulate a porous medium under complex loading situations such as borehole injection, in which fracture opening and propagation occurs with no need to predefine and impose the geometry of the fracture in the numerical mesh as preexisting fracture, instead the fracture develops spontaneously during the computation, among a set of predefined potential fracture lines.

DESCRIPTION OF THE INVENTION

The present invention relates to a computer-implemented method for use in the numerical simulation of a single or multiple interacting hydraulic fractures using zero-thickness interface elements.

According to a first aspect of the invention, the coupled geomechanical and fluid flow behavior of the porous medium is simulated following the next steps:
  defining the domain;
  creating a numerical mesh on the domain to generate a geomechanical and fluid model of the porous medium with standard finite elements comprising delimitation associated with the domain wherein edges of the mesh follow at least the boundaries of the domain and the pre-existing fractures,
  populating the numerical mesh elements with mechanical properties, at least elastic properties; and flow properties, at least permeability properties; the said populated numerical mesh forming a geomechanical and fluid flow model,
  populating the numerical mesh elements with the initial stress and initial fluid pressure values,
  assigning the boundary conditions,
  assembling of the system of equations,
  solving the evolution in time for a coupled solution of the fluid-flow and the geomechanical models.

This model reproduces the behavior of the porous medium comprising a single incompressible fluid stored in the said porous medium. The porous medium may be deformed by loads such as the initial stress field, gravity, fluid pressure; and, additional loads such as prescribed distributed load and/or fluxes at the boundaries. Other causes may be prescribed displacements and/or fluid pressures at the boundaries, prescribed load and/or flow at a point or prescribed displacement and/or fluid pressure at a point.

Along the description a general formulation in three-dimensions (3D) is used; however, the bi-dimensional (2D) simulation is deemed to be a particular case of the 3D formulated model, derived according to well-established procedures in the specialized literature. The preferred discretization of the domain is a finite element discretization wherein assembling of the system of equations and solving the evolution in time for the coupled solution of the fluid-flow and the geomechanical models are developed according to the finite element method.

Additionally to the aspects described in the previous paragraphs of this section, creating the numerical model for the analysis also comprises the following steps:
  creating a numerical mesh using zero-thickness interface elements which are inserted along the path of the pre-existing fractures,
  locating surfaces extending along finite element boundaries along which new fractures may propagate; and,
  creating a numerical mesh using zero-thickness interface elements along the mid-plane of the new fractures.

A fracture comprises two faced surfaces on opposite sides of the fracture mid-plane, a first surface being a boundary of the continuum medium and a second surface being the boundary of the continuum medium located on the other side of the mid-plane of the fracture. When the fracture is closed both surfaces are in contact and when the fracture is open because of the pressure conditions, both surfaces are close enough to deem that the space located within the fracture may be modeled as a volume extended mainly in a midplane and having certain thickness. The use of zero-thickness interface elements to represent fractures, either open or closed, is justified by the small thickness (i.e. aperture) of the fracture compared to the other dimensions of the problem.

These steps allow the coupled hydro-mechanical modeling of a saturated porous medium for the cases of an intact medium (i.e. no fractures), a naturally fractured medium (i.e. pre-existing fractures) and/or the simulation of developing fractures (i.e. hydraulic fractures) because the material strength is reached, or any combination of the afore mentioned.

The onset of fracture and the direction of propagation of the fracture cannot be predicted in advance. The shape and trajectory of a newly created fracture depends on the structure of the porous medium, i.e. its material properties, but also on the in-situ stress field, layers distribution, sets of pre-existing joints, or interference with other previously created hydraulic fractures, and the instant values of fluid pressure injected amongst other effects.

The present invention locates surfaces extending along finite element boundaries along which new fractures may propagate even if no preexisting fractures exist. Fractures in these surfaces will appear only if the effective stress conditions reach the failure surface (or yield surface) of the porous medium. If not, the model will effectively behave as if no zero-thickness interface elements existed in the surface.

In a particular embodiment, a region of the domain is populated with surfaces extending along all the finite elements boundaries allowing the skilled person to simulate the creation of fractures in any potential fracture path, including fractures intersecting or branching in complex structures. The limit of the complexity of the structure of the fractures is given by the resolution of the numerical mesh.

In a particular embodiment, the region of the domain populated with surfaces extending along all the finite elements boundaries is the whole domain.

One advantage of the present invention is that fluid pressure discontinuities and localized flow lines may be represented on the same finite element numerical mesh used for the mechanical problem, as well as the influence of fluid pressure on mechanical stresses or, conversely, of crack or fracture openings on the flow redistribution.

During the simulation, if a fracture is open, the zero-thickness element models the transversal flow and the flow along the fracture. If the fracture is considered closed, it may still model the transversal flow to the fracture depending on the value assigned to its transversal conductivity.

In a particular embodiment, the numerical method for simulating a porous medium comprising fractures is used for the simulation of oil reservoirs wherein the domain comprises at least an injection borehole and wherein before assembly of the system of equations the method comprises assigning loads according to the injection conditions, that is, the flow-rate or fluid pressure.

In a particular embodiment, after solving the evolution in time for a coupled solution of the fluid-flow and the geomechanical models, the numerical mesh is remeshed according to the displacements of the fractures to model the propagation of said fractures.

Preexisting fractures and new fractures may evolve in such a way that the effective stress increases closing the fracture. In this case, the zero-thickness finite element reproduces a closed fracture locating its nodes in adjacent surfaces. In this case the flow along the fracture is zero.

Particular embodiments of the invention will be disclosed below.

DESCRIPTION OF THE DRAWINGS

These and other features and advantages of the invention will be seen more clearly from the following detailed description of a preferred embodiment provided only by way of illustrative and non-limiting example in reference to the attached drawings.

FIGS. 8a-8b These figures show boundary and load conditions applied in the validation of an algorithm according to the invention.

DETAILED DESCRIPTION OF THE INVENTION

The present invention proposes a method implemented in a computer for the numerical simulation of a porous medium that may comprise multiple hydraulic fracture interaction and natural fractures, where the whole behavior of the porous medium is simulated according to a method as claimed in claim 1.

Zero-thickness joint or interface elements are finite elements introduced in between adjacent continuum element faces (in 3D) or edges (in 2D), with the special feature that they have one less dimension than the standard continuum elements, that is, they are lines in 2D, or surfaces in 3D. The integration of these elements is performed using a local orthogonal coordinate system based on the normal to the surface, and the longitudinal direction (in 2D) or directions (in 3D) aligned with the interface line (in 2D) or surface (in 3D).

A constitutive numerical model is assigned to each zero-thickness interface element reproducing a fracture, either a new fracture or a preexisting fracture, both in the geomechanical part of the model and in the fluid flow part of the model.

Figure 1:
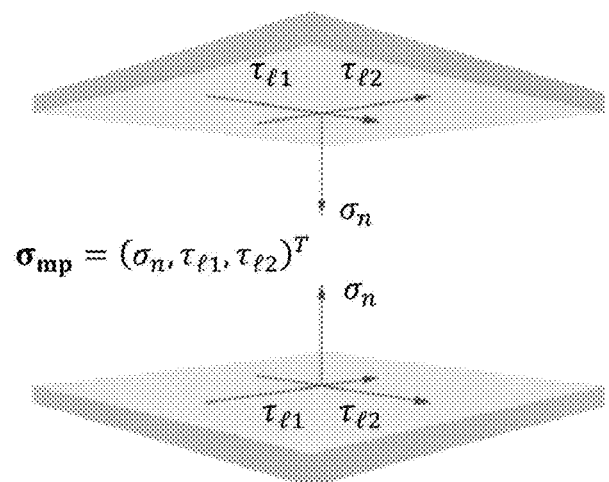
FIG. 1 This figure shows a scheme with the two faced surfaces of the fracture, separated because the fracture is open, with the main local coordinates defined by the midplane. Both surfaces are shown inclined in order to have visual access to the fracture.
Figure 2:
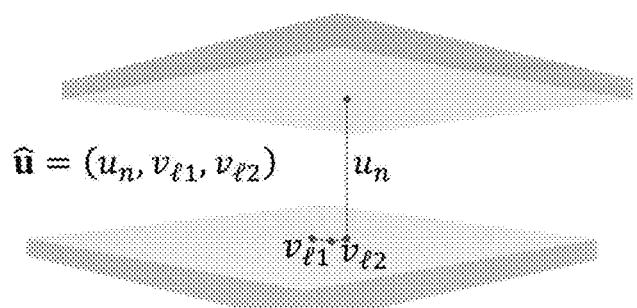
FIG. 2 This figure shows a further scheme of the previous surfaces showing the displacement vector $\hat{u}=(u_n, v_{t1}, v_{t2})$.

From the geomechanical point of view, the constitutive model of the zero-thickness interface elements defines, for each point of this interface, the relation between the interface normal and shear stress, and the corresponding interface normal and shear relative displacements, as shown in FIGS. 1 and 2, or, as described in more detail:

the components of the total stress vector $\sigma_{mp}=(\sigma_n, \tau_{l1}, \tau_{l2})$ at the facture mid-plane, where (n,l1,l2) is an orthogonal reference system with n being its normal and l1 and l2 being aligned with the fracture mid-plane;

the components of the displacement vector $\hat{u}=(u_n, v_{l1}, v_{l2})$ defined as the relative displacement of two faced points in the fracture.

Two different models have been considered as interface constitutive models: the first one is a relatively general elasto-plastic formulation, which is more adequate for existing fractures, and the second one is a fracture-based model which is more adequate for new fractures which develop during the simulation.

In the first interface constitutive model, the geomechanical model is characterized by a hyperbolic yield function $F(\sigma_n, \tau)$ with the following expression:

$$F = \tau^2 - \tan^2\varphi(\sigma_n^2 - 2a\sigma_n) = 0$$

being $\tau = \sqrt{\tau_{l1}^2 + \tau_{l2}^2}$; wherein the F=0 condition results in an hyperbolic curve in the $\sigma_n$-$\tau$ plane having two asymptotes intersecting with angle $\varphi$ with respect to the $\sigma$ axis in point a for $\tau$=0.

Figure 3:
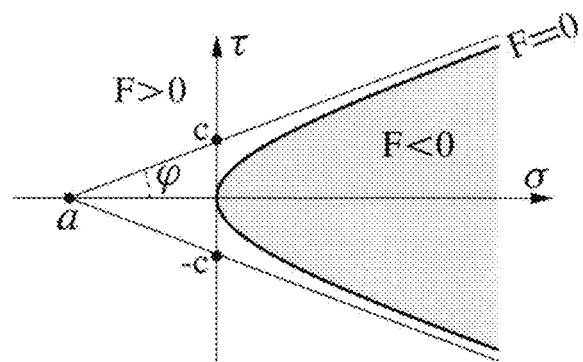
FIG. 3 This figure shows the hyperbolic failure surface $F(\sigma_n, \tau)$ represented in the $\sigma$-$\tau$ plane.

FIG. 3 plots the $F(\sigma_n, T)$ surface, wherein the dashed area is the region for F<0 (elastic regime), the clear area is the region for F>0 (not admissible) and the limit F=0 is the hyperbolic parabolic curve (plasticity). This curve has two asymptotes crossing the $\sigma$-axis at point a.

The main simplifying assumptions in this constitutive model are perfect plasticity, no dilatancy, and a linear elastic relationship between the normal stress and the normal relative displacement in compression (zero normal stress in tension).

A great advantage of this constitutive model is that, under the stated assumptions, it can be integrated in closed form for a small but finite (non-infinitesimal) increment of prescribed relative displacements $\Delta u_n, \Delta v_{l1}, \Delta v_{l2}$, as well as the stresses $\sigma_n'', \tau_{l1}'', \tau_{l2}''$ (and therefore $\tau'' = \sqrt{(\tau_{l1}'')^2 + (T_{l2}'')^2}$) and the relative displacements $u_n'', v_{l1}'', v_{l2}''$ at the beginning of time step n.

In this closed-form integration, first the state of normal stress and relative displacement at the end of the increment is determined. This is achieved by simply adding the normal relative displacements. If the sign of the resulting value at the end of the increment $u_n^{n+1} = u_n'' + \Delta u_n$ represents an opening, the interface is considered open and the interface stresses at the end of the increment are all zero. But if the sign represents closure, the normal stress is also assigned a compressive value and is calculated as $\sigma_n^{n+1} = K_n u_n^{n+1}$.

Once the normal stress is known, the ratio between $\tau_{l1}$ and $\tau_{l2}$ is the only unknown in the integration of the constitutive law.

Given the $\tau_{l1}''$ and $\tau_{l2}''$ values at the beginning of a predetermined time step n, the $\tau_{l1}^{n+1}$ and $\tau_{l2}^{n+1}$ values at the end of time step n or in the beginning of next time step n+1 are calculated as satisfying the following equation:

$$\tan\left(\frac{\beta-\lambda}{2}\right) = \tan\left(\frac{\beta-\lambda_0}{2}\right)\left(\frac{\tau + \sqrt{\tau^2 + a^2\tan^2\phi}}{\tau_0 + \sqrt{\tau_0^2 + a^2\tan^2\phi}}\right)^{-\frac{K_t \Delta v}{K_n \Delta u_n \tan\phi}}$$

given that $\tau^2 - \tan^2\varphi(\sigma_n^2 - 2a\sigma_n) = 0$, wherein $\beta$ relates the imposed tangential relative displacements $\Delta v_{l1}$ and $\Delta v_{l2}$, $K_n$ and $K_t$ are the normal and shear stiffness moduli respectively, $\lambda_0$ is the ratio between $\tau_{l1}''$ and $\tau_{l2}''$; and, $\lambda$ is the ratio between $\tau_{l1}^{n+1}$ and $\tau_{l2}^{n+1}$. The model is defined in more detail with some examples in the publication of Gens et al 1995 [Gens, A., Carol, I., and Alonso, E. E., 1995. Rock joints: FEM implementation and applications. In Selvadurai, A. S. P. and Boulon, M., editors, *Mechanics of Geomaterial Interfaces*, pp. 395-420. Elsevier].

In the second particular embodiment, the geomechanical constitutive model for the zero-thickness interface consists of a fracture energy-based formulation also formulated within the framework of elasto-plasticity. The yield surface is still a hyperbola, same as in the previous case, but in this case it incorporates some tensile strength $\chi$, additional to the apparent cohesion and friction angle, c, $\varphi$. Parameters $\chi$, c of this hyperbola evolve with an internal variable denoted as the work spent in fracture processes, $W^{cr}$, in such a way the tensile strength $\chi$ vanishes when $W^{cr}$ reaches the value of the tensile fracture energy $G_f^I$, and the apparent cohesion vanishes when it reaches a second asymptotic shear-compression fracture energy $G_f^{IIa}$. The model and some basic verification examples are described in sufficient detail in the article of Carol et al, 1997 [Carol, I., Prat, P. C., and López, C. M., 1997. A normal/shear cracking model. Application to discrete crack analysis. *ASCE J. Engrg. Mech.*, 123(8):765-773].

Figure 4:
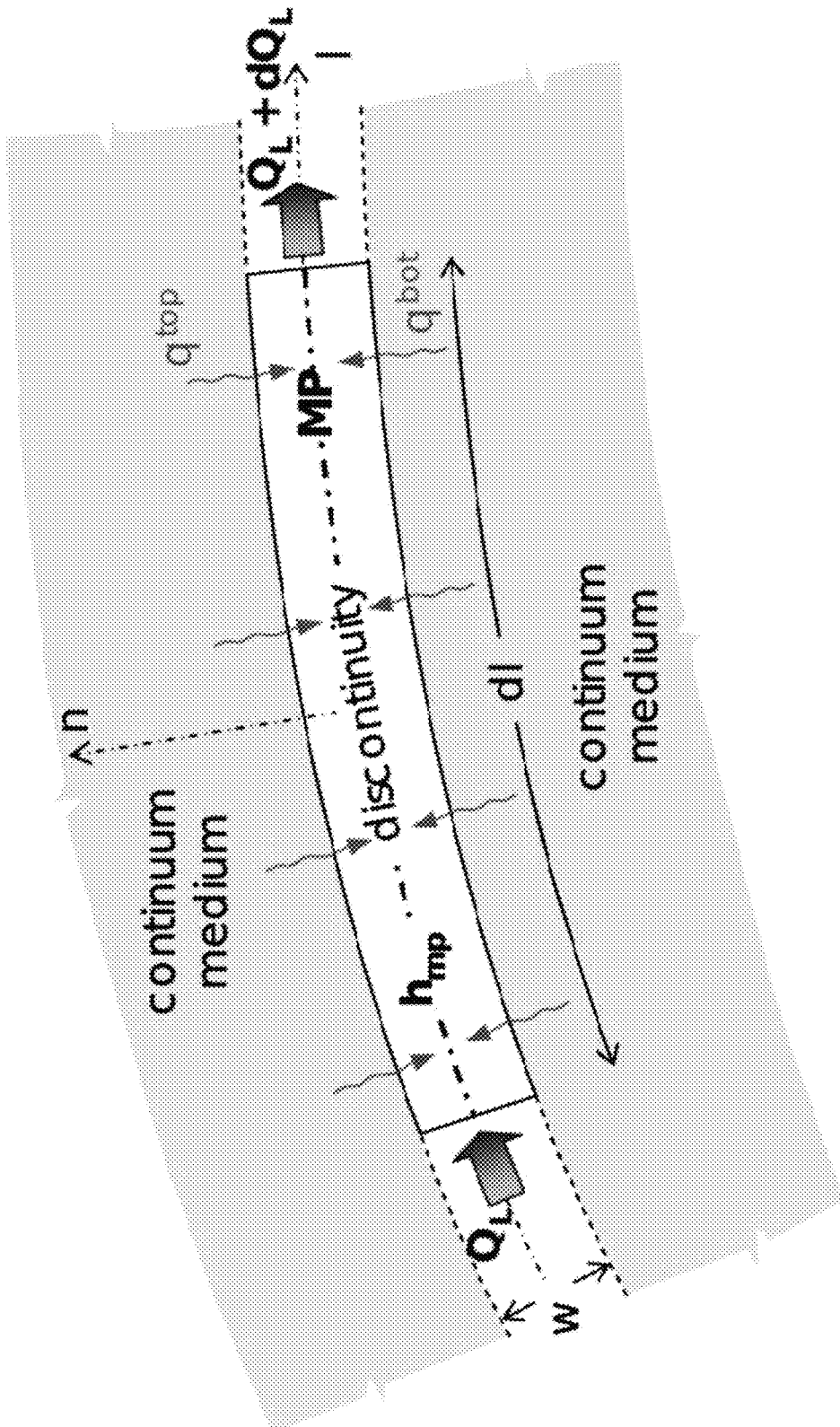
FIG. 4 This figure shows a scheme of the sectional view of a fracture and the main variables involved in the fluid model for the fracture.

In a particular embodiment the fluid flow model is formulated in terms of Darcy's law. Darcy flow is assumed in the continuum elements and the flow within the facture. The formulation in the zero-thickness interface elements, comprises a longitudinal flow and a transversal flow (FIG. 4).

The governing equation for the longitudinal fluid flow is the continuity equation given, in the particular case of 2D, by:

$$\frac{\partial Q_l}{\partial l} + \frac{1}{M}\frac{\partial p_m}{\partial l} + \alpha \frac{\partial u_n}{\partial t} = 0$$

where the total discharge is related to the gradient of fluid pressure via a Darcy-like equation, l is the length along the fracture, t the time, α the fracture Biot's coefficient, M the Biot's Modulus and $Q_l$ the flow rate that can be expressed in a generalized form as $$Q_l = -T_l\left(\frac{1}{\gamma_f}\frac{\partial p_m}{\partial l} + \frac{\partial z_m}{\partial l}\right)$$

being $T_l$ the longitudinal transmissivity, $\gamma_f$ the fluid specific weight, $p_m$ the fluid pressure at the fracture mid-plane and $z_m$ the depth coordinate at the fracture mid-plane In a particular embodiment, the longitudinal transmissivity is defined according to a cubic law:

$$T_l = \frac{g}{12v_f}u_n^3$$

where g stands for gravity and $v_f$ for the fluid kinematic viscosity. On the other hand, the transversal flow $q_t$ is assumed to depend on the fluid pressure jump across the discontinuity, with transversal conductivity $K_t$ $$q_t = K_t(p^{bot} - p^{top})$$

where $p^{bot}$ and $p^{top}$ stand for the fluid pressure on each face of the fracture.

The coupling between the mechanical model and the fluid model is formulated via the influence of deformation on the permeability and fluid content of both continuum and interfaces on one hand, and introducing the principle of effective stress on the other.

The governing equations for the mechanical response of the porous medium are:

Equilibrium equation: $L_c^T \sigma + \rho g = 0$

Effective stress principle: $\sigma' = \sigma + \alpha_c m_c p$

Constitutive relationship: $\sigma' = D_c \varepsilon$

Compatibility equation: $\varepsilon = L_c u$ where $\sigma = (\sigma_{11}, \sigma_{22}, \sigma_{33}, \sigma_{12}, \sigma_{13}, \sigma_{23})$ is the 6-component vector representing the stress tensor in engineering notation, $\varepsilon = (\varepsilon_{11}, \varepsilon_{22}, \varepsilon_{33}, \gamma_{12}, \gamma_{13}, \gamma_{23})$ is the 6-component vector representing also the total strain tensor in engineering notation in which the engineering shear deformation components are twice their respective tensorial components ($\gamma_{12} = 2\varepsilon_{12}$, $\gamma_{13} = 2\varepsilon_{13}$, $\gamma_{23} = 2\varepsilon_{23}$), $L_c$ is the following differential operator matrix $$L_c = \begin{pmatrix} \frac{\partial}{\partial x_1} & 0 & 0 & 0 & \frac{\partial}{\partial x_3} & \frac{\partial}{\partial x_2} \\ 0 & \frac{\partial}{\partial x_2} & 0 & \frac{\partial}{\partial x_3} & 0 & \frac{\partial}{\partial x_1} \\ 0 & 0 & \frac{\partial}{\partial x_3} & \frac{\partial}{\partial x_2} & \frac{\partial}{\partial x_1} & 0 \end{pmatrix}^T$$

g is the gravity vector, typically g=g(0,0,1), ρ is the bulk or averaged density of the fluid-solid system, $\sigma' = (\sigma'_{11}, \sigma'_{22}, \sigma'_{33}, \sigma'_{12}, \sigma'_{13}, \sigma'_{23})$ is the 6-component effective stress vector, $\alpha_c$ is the Biot-Willis coefficient, $m_c$ is the equivalent to the identity tensor in this vector formulation (i.e. (1,1,1,0,0,0)), p is the pore fluid pressure, $D_c$ is the rock constitutive matrix according to elasto-plastic conditions and u is the displacement vector. Determining the stress vector by means of the six stress components must be interpreted that the method is formulated in the more general scenario, a three-dimensional domain. If for instance a two dimensional domain is used then only existing variables will be involved in the calculation; i.e., ($\sigma_{11}$, $\sigma_{22}$, $\alpha_{12}$). The same interpretation applies to the rest of variables.

The governing equations for the fluid flow in the porous medium, are:

Continuity equation: $divq + \left(\frac{\alpha_c - \phi}{K_s} + \frac{\phi}{K_f}\right)\frac{\partial p}{\partial t} + \alpha_c \frac{\partial \varepsilon_v}{\partial t} = 0$ Darcy's law (general form): $q = -\frac{K_c}{\gamma_f}(gradp - \rho_f g)$ where q is the fluid flux, $K_s$ is the solid bulk modulus, $K_f$ is the fluid bulk modulus, Ø is porosity, $\varepsilon_v$ is the volumetric strain, $K_c$ is the rock hydraulic conductivity tensor, $\gamma_f$ is the fluid specific weight and $\rho_f$ is the fluid density.

In a particular embodiment, the rock hydraulic conductivity is defined according to the volumetric strain ($\varepsilon_v$):

$$K_c = \left(\frac{K_i}{n_i^3}\frac{(e^{\varepsilon_v} - (1 - n_i))^3}{e^{\varepsilon_v}}\right)I$$

where $K_i$ is the initial hydraulic conductivity, $n_i$ is the initial porosity, and I the identity matrix.

The governing equations of the mechanical behavior of a saturated fracture are posed at the fracture mid-plane and in a reference system aligned with the fracture mid-plane:

Effective stress principle: $\sigma'_{mp} = \sigma_{mp} + \alpha_f m_{mp} p_{mp}$ Constitutive relationship: $d\sigma'_{mp} = D_{mp}d\hat{u}$ Compatibility equation: $d\hat{u} = L_{mp}du$ where $\sigma'_{mp}$ is the effective stress vector at the fracture mid-plane, $\alpha_f$ is the fracture Biot's coefficient, $m_{mp}$ introduces the influence of fluid pressure in the direction normal to the discontinuity axis, i.e. [1,0,0] in the orthogonal reference system (n, l1, l2), $p_{mp}$ is the fluid pressure at the mid-plane of the fracture, $\hat{u}$ is the relative displacement vector (($u_n$, $v_{l1}$, $v_{l2}$), so $v_{l1}$ and $v_{l2}$ represent sliding and $u_n$ aperture/closing), and $L_{mp}$ is an operator that relates the relative displacement vector to the actual displacement at the faces of the fracture.

The governing equations of the fluid flow along and across the fracture are also posed at the discontinuity mid-plane and in the same reference system aligned with the fracture mid-plane:

Continuity equation: $divQ_l + \frac{1}{M_f}\frac{\partial p_{mp}}{\partial t} + \alpha_f \frac{\partial u_n}{\partial t} = 0$ Darcy's law: $Q_l = -T_l grad\Big|_f \left(\frac{p_{mp}}{\gamma_f} + z\right)$ Transversal flow: $q_t = K_t(p^{bot} - p^{top})$ where $u_n$ is the fracture aperture (i.e. the first component of the relative displacement vector $\hat{u}$ defined earlier), $Q_l$ is the local flow rate vector along the fracture mid-plane, i.e. longitudinal along (l1,l2), $\alpha_f$ and $M_f$ respectively are the fracture Biot's coefficient and modulus, $T_l$ is the mid-plane longitudinal transmissivity matrix, $q_t$ is the local flow rate vector transversal to the fracture mid-plane, i.e. along the normal direction (n), $K_t$ is the transversal conductivity and $p^{bot}$ and $p^{top}$ are the fluid pressure on each face of the fracture.

In a particular embodiment, the transmissivity along the fracture mid-plane is a cubic law where the principal components of $T_l$ are proportional to the cube of the aperture $u_n^3$.

The system of coupled equations presented earlier is considered in a domain $\Omega$ where a set of boundary and initial conditions exists. The domain $\Omega$ is discretized via standard finite elements for the continuum, and zero-thickness interface elements for pre-existing fractures and any potential fracture path that may develop as explained earlier. When considering the linear momentum and fluid mass balance equations in weak form and introducing the rest of equations (effective stress principle, constitutive relationships and compatibility equation), a set of discretized coupled equations is obtained for each finite element (standard and zero-thickness, the expressions of which for the mechanical and fluid flow formulations can be found in classical books for the continuum and in specialized literature for the zero-thickness interface elements, e.g. Gens et al 1995 [Gens, A., Carol, I., and Alonso, E. E., 1995. Rock joints: FEM implementation and applications. In Selvadurai, A. S. P. and Boulon, M., editors, Mechanics of Geomaterial Interfaces, pp. 395-420. Elsevier] and Segura, Carol 2004 [Segura, J. M., Carol, I., 2004. On zero-thickness interface elements for diffusion problems, International Journal for Numerical and Analytical Methods in Geomechanics, 28(9), pp 947-962]). After assembly, the following system of coupled equations is reached:

$$\int_\Omega B^T \sigma' d\Omega - Lp = F^u$$

$$Ep + L^T \frac{du}{dt} + S\frac{dp}{dt} = F^p$$

wherein L is the assembled coupling matrix, E is the assembled permeability matrix, S is the assembled storage capacity matrix, u and p are the assembled main unknowns vectors of displacement and fluid pressure respectively, t stands for time, and $F^u$ and $F^p$ are the assembled right hand side vectors related to displacements and fluid pressure, and B denotes the displacement-to-strain element matrix in standard finite elements or the displacement-to-relative-displacement element matrix in special zero-thickness interface elements (Gens et al. 1995) depending on the element being considered. The vector resulting from the integral of $B^T\sigma'$ over the entire domain volume $\Omega$ has to be understood as the result of the assembly of the individual element vectors that correspond to the integrals over the volume of each finite element in the mesh, as it is standard procedure in finite element formulation. The expression above is valid for any (linear or nonlinear) constitutive material model. For the particular case of linear elasticity the first of the above equations is generally rephrased as $$Ku - Lp = F^u$$

expression in which K is the global elastic stiffness matrix obtained as the result of the assembly of the individual element matrices that correspond to the integrals over the volume of each finite element in the mesh, as it is standard procedure in finite element formulation.

This is a particular expression of the system of equations. The system of equations may be expressed in many other forms and all those expressions coming from the same coupled mechanical model and fluid model falls within the invention.

In a particular embodiment, the discrete integration in time is carried out using the generalized trapezoidal rule, obtaining the following system of equations at time $n+\theta$, where the main unknowns are the increment of displacements $\Delta u_{n+1}$ and fluid pressure $\Delta p_{n+1}$ at time $n+1$, $t_{n+1}$:

$$\int_\Omega B^T \sigma'_{n+\theta} d\Omega - \theta L \Delta p_{n+1} = \hat{F}^u_{n+\theta}$$

$$L^T \Delta u_{n+1} + (S_{n+\theta} + \lambda \Delta t_{n+1} E_{n+\theta}) \Delta p_{n+1} = \hat{F}^p_{n+\theta}$$

The $B^T\sigma'_{n+\theta}$ term is dependent on the constitutive behavior of the fractures and also on the continuum if it is not considered elastic. The $E_{n+\theta}$ term is dependent on the permeability matrix which depends on the fracture aperture and also on the continuum volumetric strain, if it is considered to have a permeability which depends on the deformation. These terms depend on the solution at time $n+1$, $t_{n+1}$, therefore the system of equations is solved iteratively.

In particular, the system of equations may be rewritten as:

$$\begin{bmatrix} \tilde{K} & \tilde{L} \\ \tilde{L}^T & \tilde{E} \end{bmatrix} \begin{bmatrix} \Delta u \\ \Delta p \end{bmatrix} = \begin{bmatrix} \tilde{F}^u \\ \tilde{F}^p \end{bmatrix}$$

being $\Delta u$ the increment of displacement and $\Delta p$ the increment of fluid pressure; and, the $\tilde{K}$, $\tilde{L}$ and $\tilde{E}$ are submatrices of the general matrix of coefficients and $\tilde{F}^u$, $\tilde{F}^p$ the subvector coefficients related to the displacements and fluid pressure variables respectively; wherein $\tilde{K}$ gather the variables contained in $B^T\sigma'_{n+\theta}$ and $\tilde{E}$ gather the variables contained in the $E_{n+\theta}$ term.

The system of coupled equations can be solved using a numerical method such as Newton Raphson, Line Search, etc. if a monolithic approach is used or in a staggered way if two separate codes (i.e. one for the mechanical problem and another one for the fluid flow problem) are used in a loose way, the latter strategy including particular approaches such as iterating until convergence, advancing in time without converging, or using a one way approach in which the information is passed from one of the codes to the other only and no information is transferred in the other direction. For each time step and for the whole domain (i.e. fractures+porous medium) the displacements and fluid pressure are obtained at the nodes of the finite element mesh; and, stress and fluid flow are obtained at the gauss points of the finite elements (both standard and zero-thickness interface)

Particular Example 1: Single 2D Hydraulic Fracture Study

The above formulation has been applied to the study of particular examples of hydro-mechanic coupled problems, to validate the algorithm of the invention. The example presented herein is the analysis of a single hydraulic fracture in 2-D. For the purpose of verification, the geometry and parameters have been taken from the work of Boone and Ingraffea [Boone, T. J. & Ingraffea, A. R., 1990. A numerical procedure for simulation of hydraulically-driven fracture propagation in poroelastic media, Int. J. Numer. Anal. Meth. Geomech., 14:27-47.], who combined 2-D Finite Elements for the mechanical behavior, with 1-D Finite Differences for the flow along the crack channel.

Figure 5:
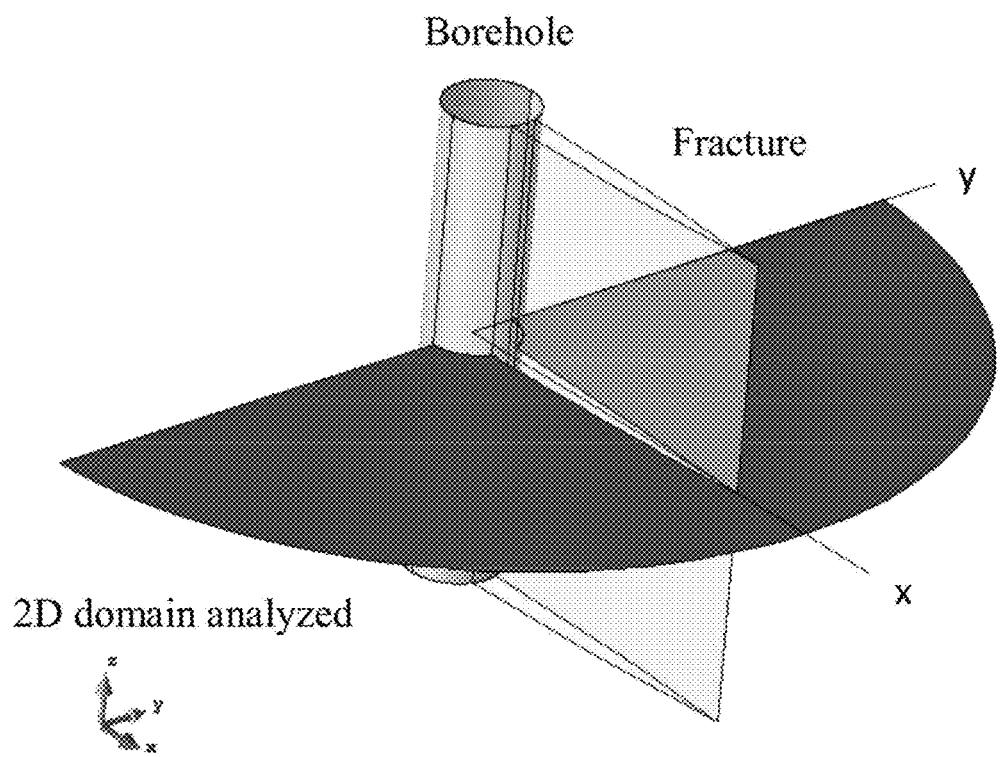
FIG. 5 This figure shows a domain representing a transversal cross-section of the borehole and fracture of a validation example.
Figures 6, 7:
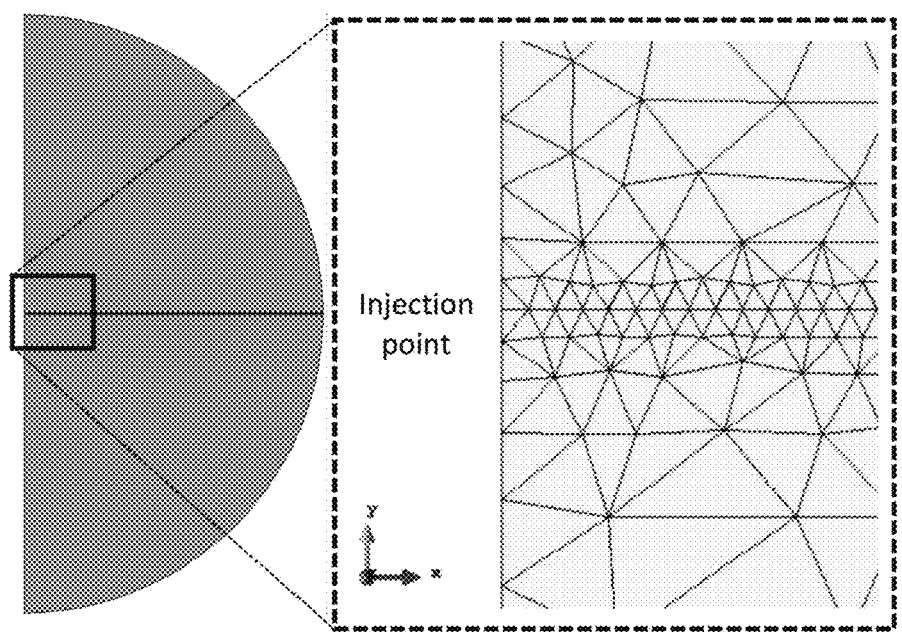
FIG. 6 This figure shows a schematic representation of a standard linear triangular finite element mesh that discretizes the domain of FIG. 5.
FIG. 7 This figure shows a detail of the discretization of FIG. 6, at the injection point.

A semicircle domain of radius 80 m representing a transversal cross-section of the borehole and fracture, as depicted in FIG. 5, is discretized with the standard linear triangular finite element mesh of FIG. 6. The fracture is inserted along the abscissa axis with double node linear interface elements, that is, the zero-thickness elements as shown in FIG. 7.

The boundary and load conditions are applied in two steps, which can be observed in FIGS. 8a and 8b: FIG. 8a shows a distributed load of 1.0 MPa applied over the outer boundary in order to simulate the in-situ initial stress. Initial fluid pressure is assumed with constant null value at the boundary and flow analysis for this initial stress calculation is run as steady state, with a resulting zero fluid pressure in the entire domain. FIG. 8b shows a fluid being injected at the fracture mouth with constant Q=0.0001 m³/s. The remaining boundary conditions shown in FIG. 8a are maintained. This step is run under transient conditions with increasing time steps until a total duration of 25 seconds.

The continuum elements are assumed to be linear elastic and isotropic. With regard to flow, two scenarios are considered, one without leak-off (impervious case, i.e. case in which the continuum surrounding the fracture is assumed impermeable), and another one with low leak-off (pervious case, i.e. case in which the continuum surrounding the fracture is considered permeable). The case without leak-off makes it possible to compare with analytical solutions, since the porous medium is assumed impermeable and the fluid injected into the fracture does not leak into the porous medium. On the other hand, the pervious case considers a small permeability value for the porous medium, which allows part of the fluid injected into the fracture to leak-off into the porous medium through the fracture faces. In this case a comparison with a numerical solution existing in the literature is shown. All parameters used in these cases are the following:

Material Properties for the Continuum:
E (Young mudulus): 14400.0 MPa in both cases
v (Poisson ratio): 0.2 in both cases
K (hydraulic conductivity): $1 \times 10^{-25}$ m/s for impervious case and $2 \times 10^{-7}$ for pervious case
Ks (skeleton compressibility): 36000 MPa in both cases
α (Biot's coefficient): 0 in both cases
Material Properties of Interfaces:
$K_n$ (Normal stiffness): 1000000 MPa/m in both cases
$K_t$ (Tangential stiffness): 1000000 MPa/m in both cases
tan φ (friction angle): 0.577 in both cases
a (apex): 0 in both cases
c (cohesion): 0 in both cases
$Tl_0$ (initial longitudinal transmissivity): 0 m²/s in both cases
Kt (Transversal conductivity): 1 Hz in both cases
α (Biot's coefficient): 1 in both cases
M (Biot's modulus): 10000000000 MPa/m in both cases The interface elements are assumed to behave according to the elasto-plastic model described above. Normal and shear elastic stiffness are set to very high values (at least three orders of magnitude larger than the continuum elastic modulus divided by the average separation between discontinuities), which can be understood as penalty coefficients in order to minimize elastic deformations including interpenetration. As a result, practically all the relative displacements will correspond to plastic deformations representing opening/sliding of the interface. Parameters of the yield surface (assumed fixed in this analysis, perfect plasticity) represent a lower bound scenario of the interface strength, in particular tensile strength is assumed zero as in the work of Boone and Ingraffea previously cited, that is, the first particular embodiment described above for the interface geomechanical constitutive law is used for these calculations.

The hydraulic behavior of the interface is assumed to follow a cubic law, i.e., the transmissivity along the fracture mid-plane is a cubic law where Ti is proportional to the cube of the aperture $u_n^3$. Except for those parameters related to the elasto-plastic model, the aforementioned list of material properties of interfaces shows the parameters used for this study.

Impervious Case

Spence [Spence, D. & Sharp, P., 1985. Self-Similar Solutions for Elastohydrodynamic Cavity Flow, Proc. R. Soc. Lond. A, 400(1819):289-313] and GDK [Geertsma, J. & de Klerk, F., 1969. A rapid method of predicting width and extent of hydraulic induced fractures, J. Pet. Tech., 246: 1571-1581.] obtain the following expressions for the fracture length (L), crack mouth opening displacement (CMOD) and fluid pressure at the crack mouth ($P_{cm}$):

$$L = A\left(\frac{GQ^3}{\mu(1-v)}\right)^{1/6} t^{2/3}$$

$$CMOD = B\left(\frac{\mu(1-v)Q^3}{G}\right)^{1/6} t^{1/3}$$

$$P_{cm} = C\left(\frac{G^3 Q \mu}{(1-v)^3 L^2}\right)^{1/4} + \sigma_0$$

In those formulae, A, B and C take the values 0.65, 2.14 and 1.97 for Spence's model, and 0.68, 1.87 and 1.38 for the GDK model, Q is the injection flow rate, G is the shear modulus, μ is the dynamic viscosity, v is the poisson's ratio and $\sigma_0$ is the in-situ stress normal to the crack path.

Figure 9:
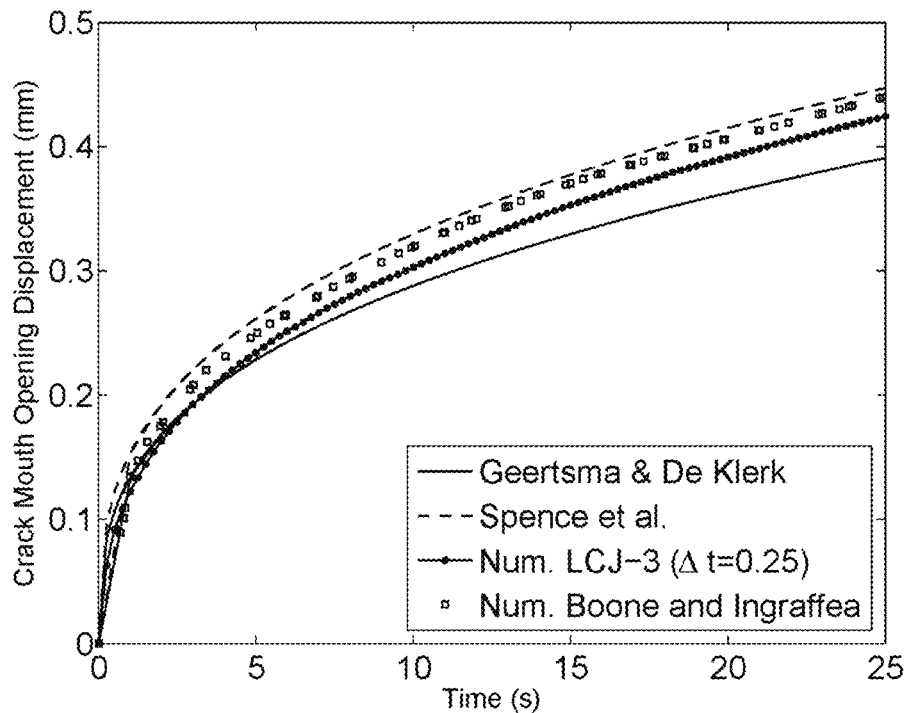
FIG. 9 This figure shows the crack mouth opening displacement (CMOD) evolution for the impervious case obtained using an algorithm of the invention, together with Spence, GDK and Boone & Ingraffea solutions.
Figure 10:
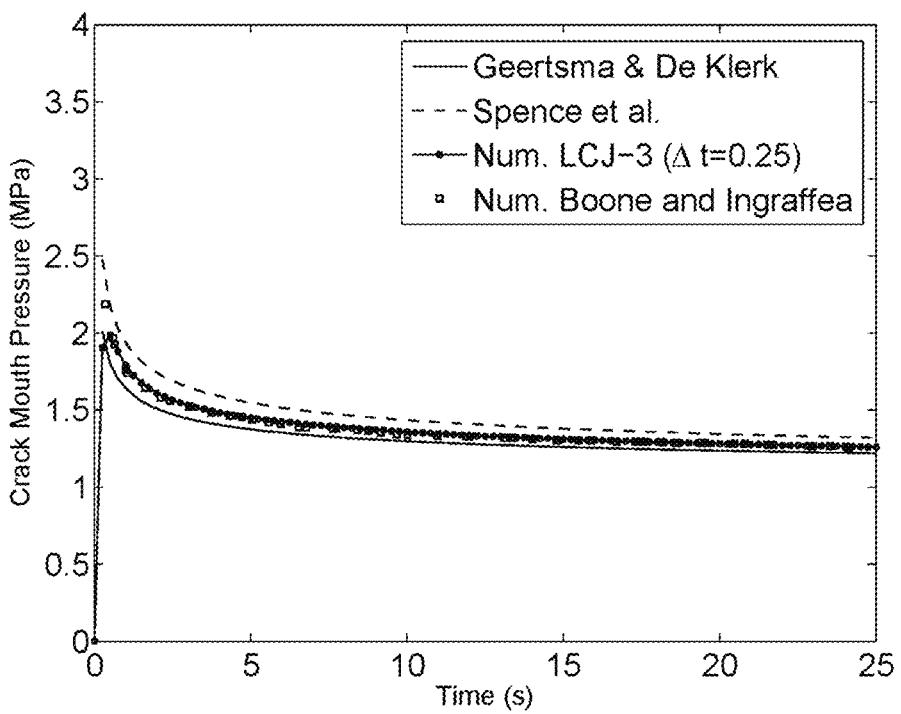
FIG. 10 This figure shows the crack mouth fluid pressure (CMP) evolution for the impervious case obtained using an algorithm of the invention, together with Spence, GDK and Boone & Ingraffea solutions.

FIGS. 9-10 show the results obtained using an algorithm of the invention, together with those three formulae, and the numerical results obtained by the work of Boone & Ingraffea for the first 25 seconds of injection. The three curves exhibit a relatively good coincidence.

Figure 11:
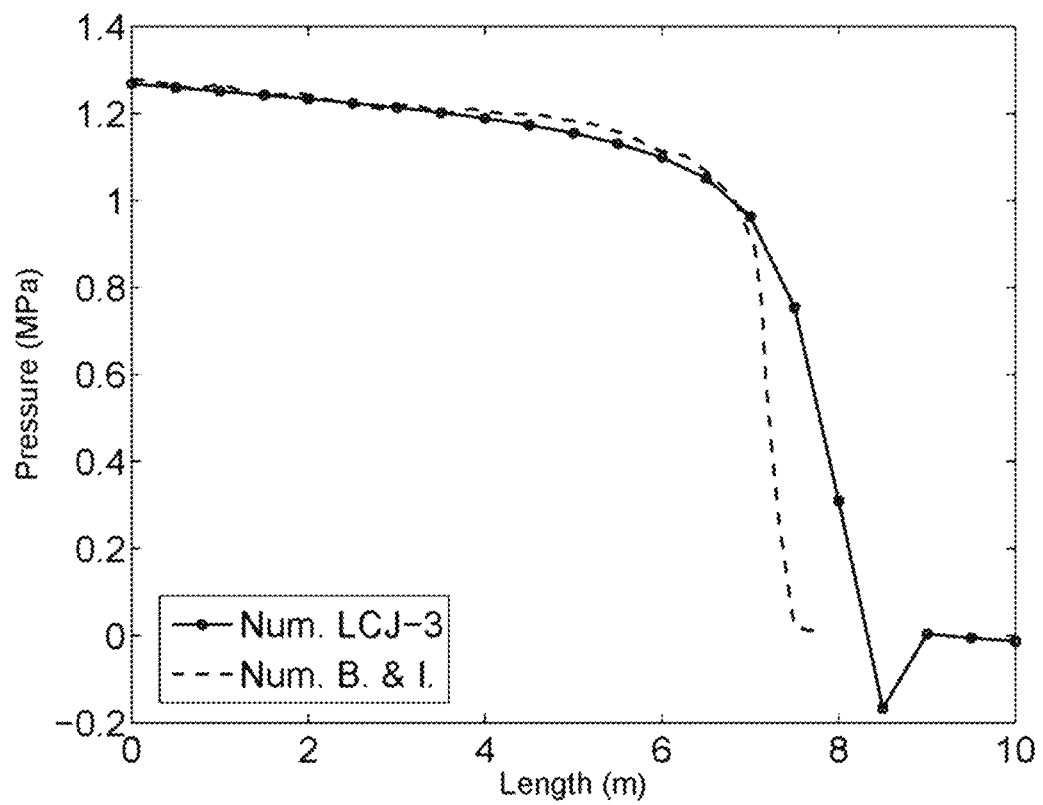
FIG. 11 This figure represents the fluid pressure profile for time 25 s along the fracture both for the present calculation and for the Boone & Ingraffea results.

FIG. 11 represents the fluid pressure profile along the fracture at the final stage of 25 sec, both for the present calculation and for the Boone & Ingraffea results. The match is quite good except near the crack tip, which seems possible given the different approaches for the modeling of flow continuity. Note in FIG. 11 the negative fluid pressure near the crack tip known as fluid lag, which it has been obtained in the proposed model as the result of the delay between opening of the crack and filling with fluid, which in an impermeable medium can only reach the crack tip along the fracture itself.

It should be noted that for impermeable rock, the CMOD rate seems to evolve towards a limit constant value, similarly to the rate of crack extension, which corresponds naturally to the fact that all the fluid injected at constant rates has to be stored in the crack volume.

Pervious Case

The only changes with regard to the previous section are the consideration of permeable rock, and the in-situ stress, with similar values to the ones used in Boone and Ingraffea, namely: continuum permeability $K=2 \cdot 10^{-7}$ m/s and initial in-situ stress 1.2 MPa (total stress=effective stress in this case).

Figure 12:
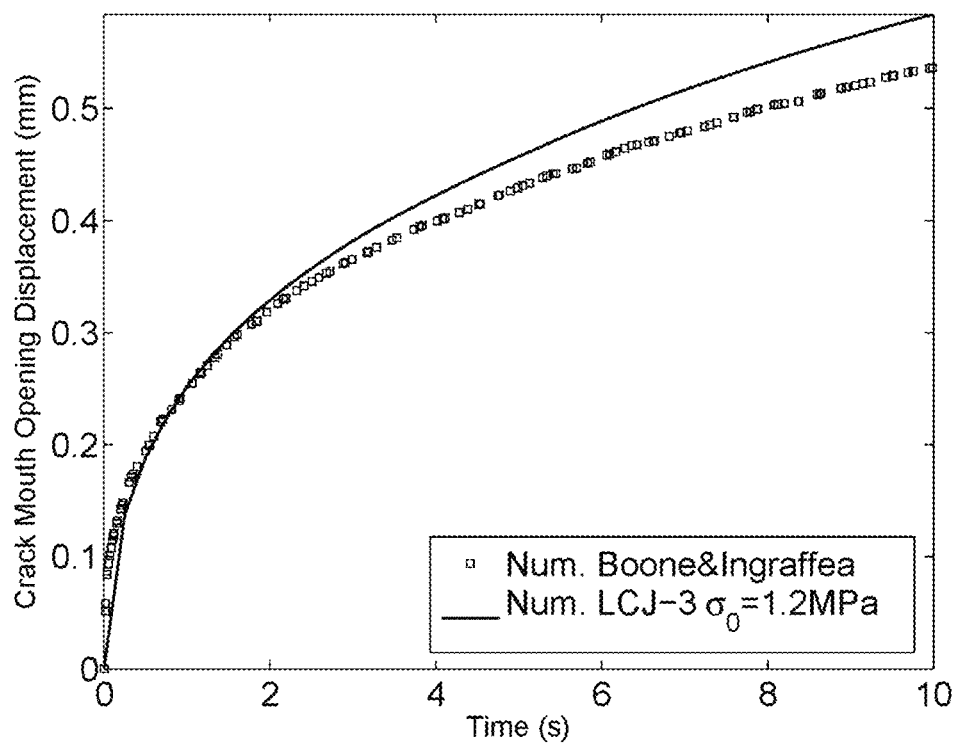
FIG. 12 This figure shows the crack mouth opening displacement (CMOD) evolution for the pervious case obtained using an algorithm of the invention, together with Boone & Ingraffea results.
Figure 13:
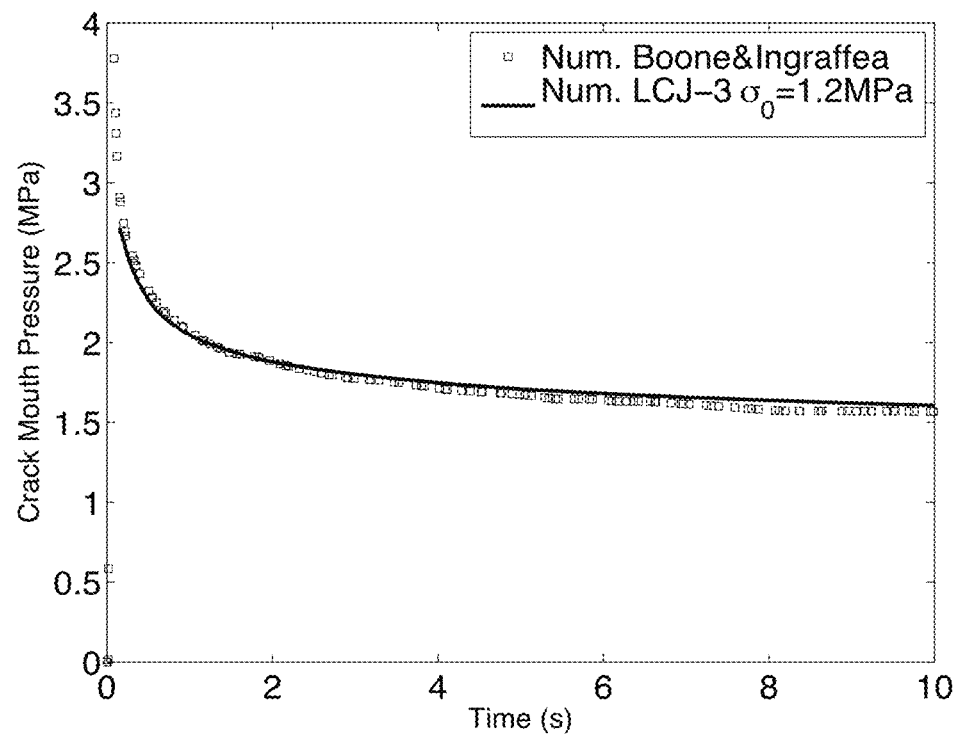
FIG. 13 This figure shows the crack mouth fluid pressure (CMP) evolution for the pervious case obtained using an algorithm of the invention, together with Boone & Ingraffea results.

In this case, no analytical formula exists and the only comparison can be done with the results published in Boone and Ingraffea. As a novelty, the amount of fluid being leaked into the rock continuum can also be evaluated. The original reference only gives results for the first 10 seconds and so initial comparisons shown in FIGS. 12-13 are made for that time.

Particular Example 2: Hydraulic Fracture Interaction in Homogeneous Medium

The example presented herein is the analysis of multiple interacting hydraulic fractures in 2-D, according to a method of the invention. The purpose of this example is to show how the proposed method is able to capture the influence of one previous hydraulic fracture in a subsequent fracture, by modifying the fracture trajectory due to the local changes induced in the stress field.

Figure 14:
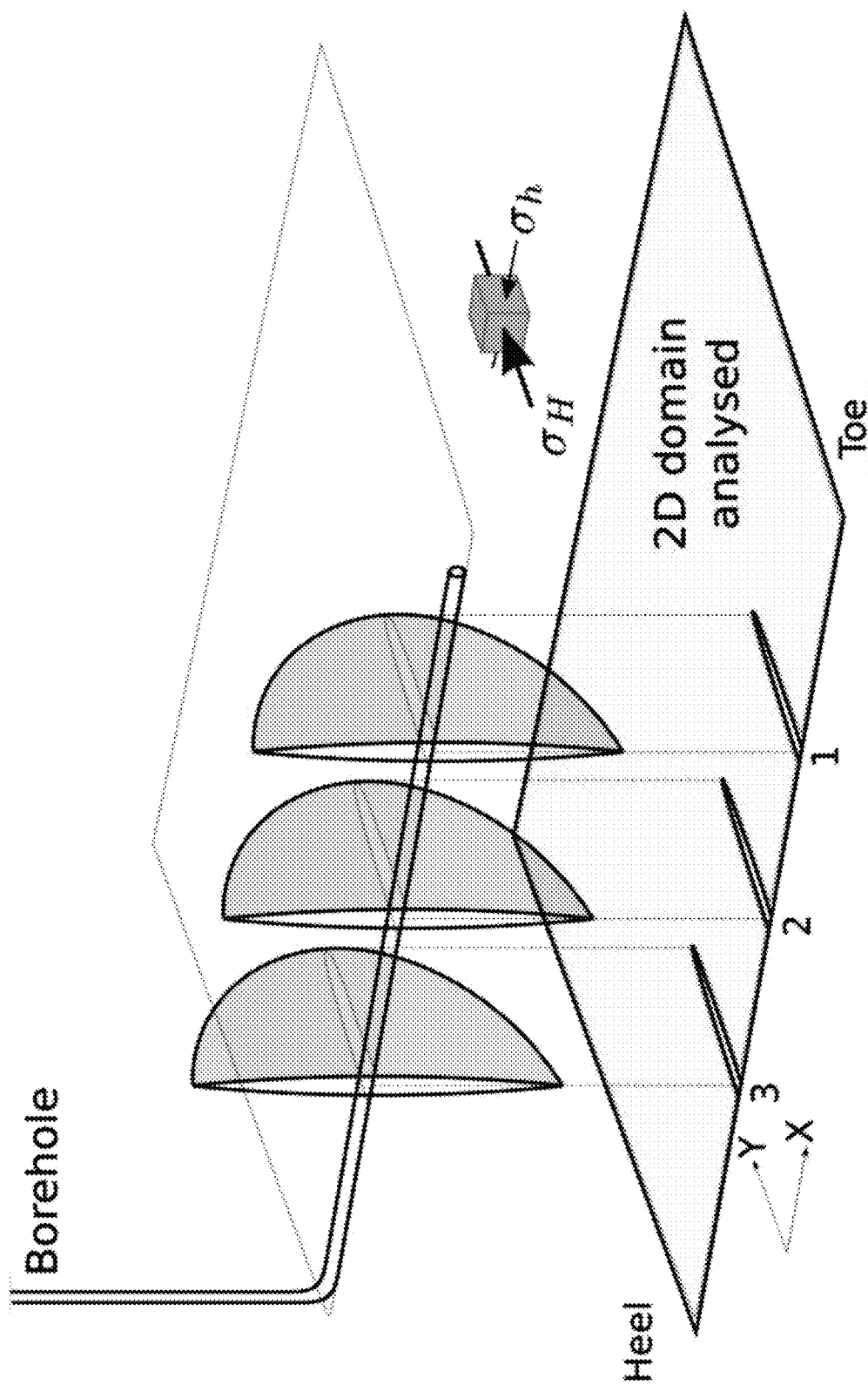
FIG. 14 This figure shows a domain representing a transversal cross-section of the borehole and three fractures of a validation example.
Figure 15:
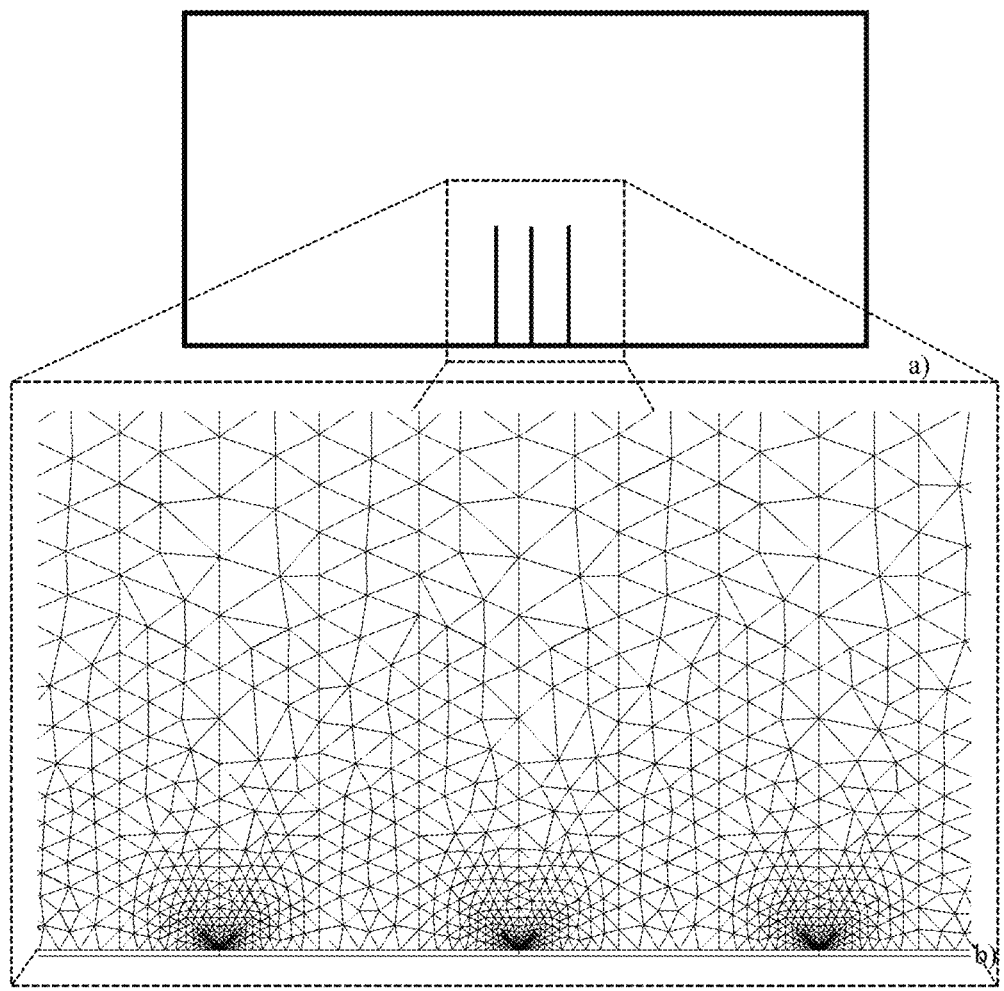
FIGS. 15a-15b These figures show the 2D finite element model for the second validation example and a detailed representation of the finite element mesh in the zone near the injection points.

The example consists of a sequence of three fracture jobs along a horizontal perforation (see FIG. 14). The finite element model is depicted in FIG. 15, with a detailed representation of the finite element mesh in the zone near the injection points, which are three points located at regular intervals on the lower part of the boundary. All the lines in this zone incorporate zero-thickness interface elements to allow fractures to have multiple possibilities of propagation. This includes the trivial straight paths which would correspond to a propagation on virgin homogeneous rock, but also many other options. The analysis is performed assuming plane strain, small deformations and isothermal conditions.

Figure 16:
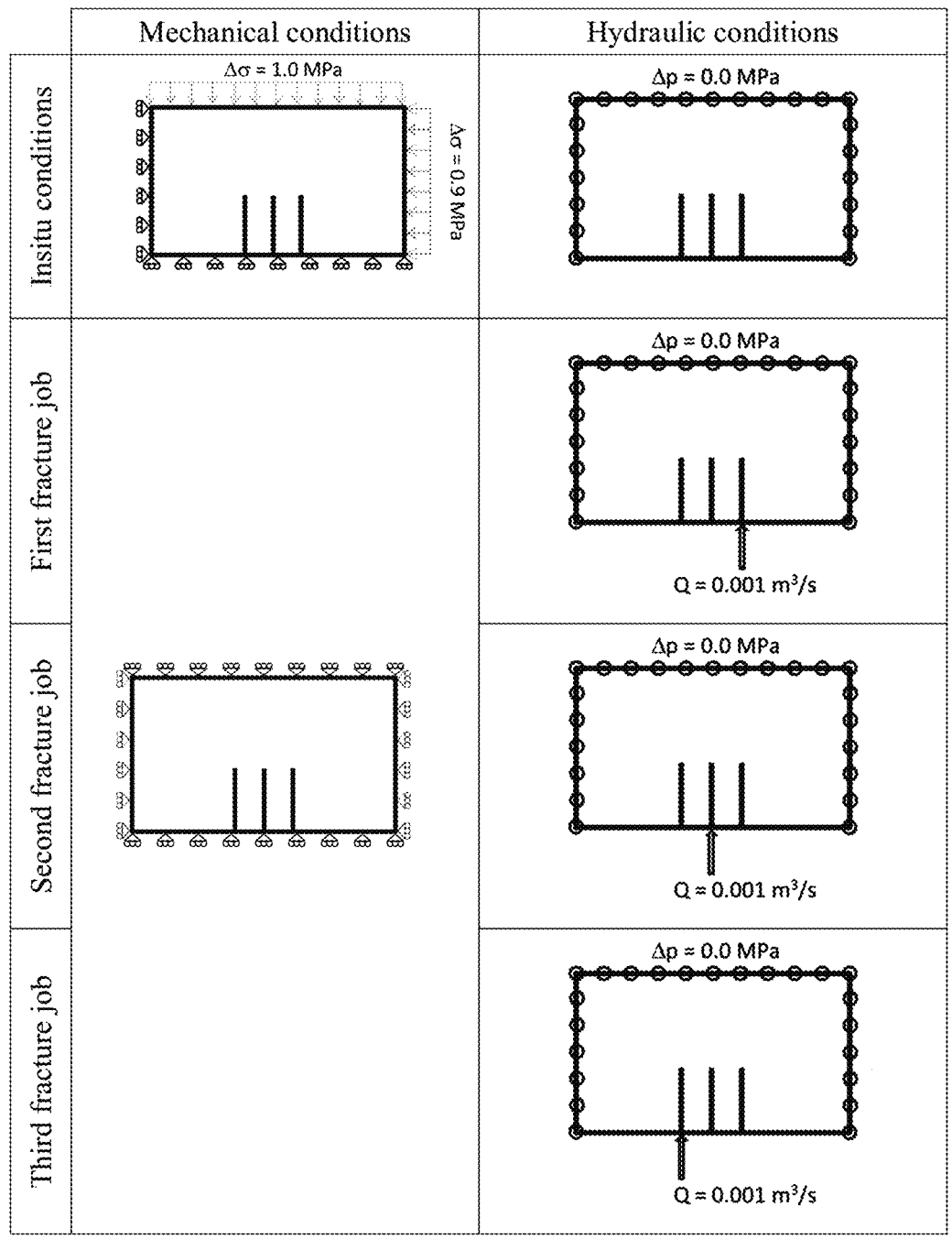
FIG. 16 This figure shows the boundary conditions for the second validation example.

The behavior of continuum is supposed to be elastic, and the properties are shown below. For the flow through the continuum, a low permeability medium has been assumed with no coupling between fluid and mechanical deformations. The mechanical behavior of the fractures (interface elements) is controlled by the elasto-plastic law defined previously as the first particular embodiment described in the invention. The hydraulic behavior of interfaces is controlled by the cubic law, considering a null initial longitudinal transmissivity. The parameter values used in the calculations are the following:

Material Properties for the Continuum:
E (Young modulus): 14400 MPa
ν (Poisson ratio): 0.2
$K_C$ (rock hydraulic conductivity): $1 \times 10^{-10}$ m/s
$K_S$ (solid compressibility): 36000 MPa
α (Biot's coefficient): 1
Material Properties of Interfaces:
$K_n$ (Normal stiffness): 1000000 MPa/m
$K_t$ (Tangential stiffness): 1000000 MPa/m
tan φ (friction angle): 0.5773
c (cohesion): 0.01 MPa
$Tl_0$ (initial longitudinal transmissivity): 0 m²/s
$K_t$ (Transversal conductivity): 1 Hz
α (Biot's coefficient): 1
M (Biot's modulus): $10^{10}$ MPa/m The boundary conditions are applied in a sequence of four steps (see FIG. 16):

1. Stress initialization: uniform distributed loads are applied over the external boundaries, with values of $\sigma_H$=1.0 MPa along the y-direction and $\sigma_h$=0.9 MPa along the x-direction. The difference of principal stresses ensures that the preferential fracture direction for the first fracture is a straight vertical line.
2. First fracture job: a flow rate of 0.0001 m³/s is injected at the first injection point during 25 s (Δt=25 s).
3. Second fracture job. The second injection starts right after the first one ends (no wait time). The conditions for the second injection are the same as the first one: flow rate of 0.0001 m³/s during 25 s (Δt=25 s).
4. Third fracture job: Again, the third job starts as the second ends (no wait time) and the injection conditions are the same (flow rate of 0.0001 m³/s during 25 s)

Figure 17:
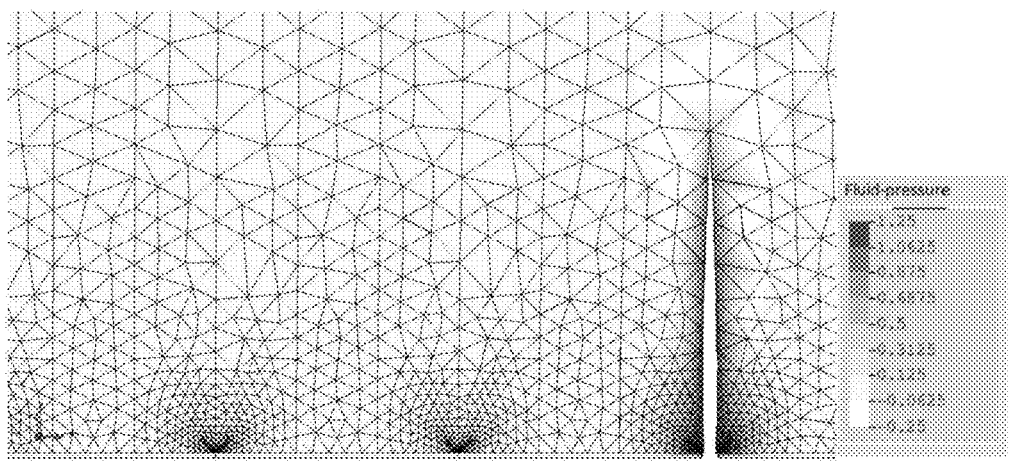
FIG. 17 This figure shows the fracture opening and fluid pressure distributions at the end of the first injection stage.
Figure 18:
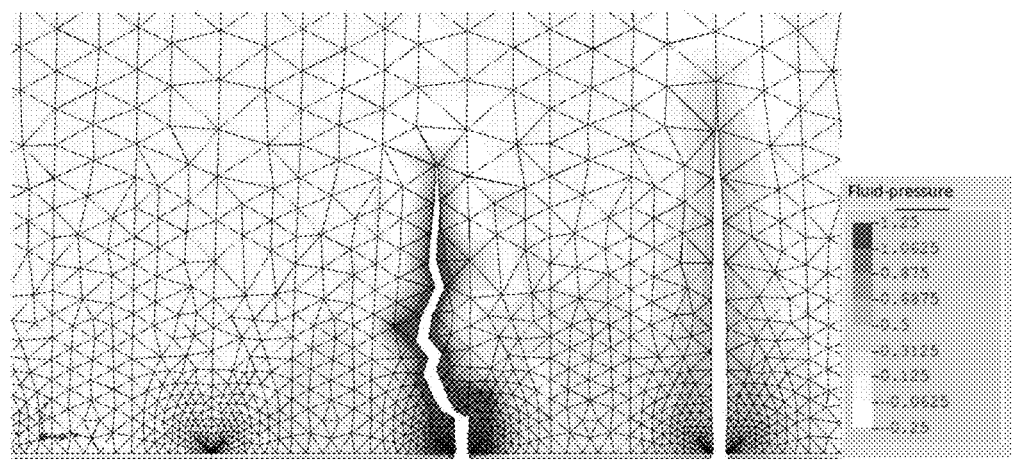
FIG. 18 This figure shows the fracture opening and fluid pressure distributions at the end of the second injection stage.
Figure 19:
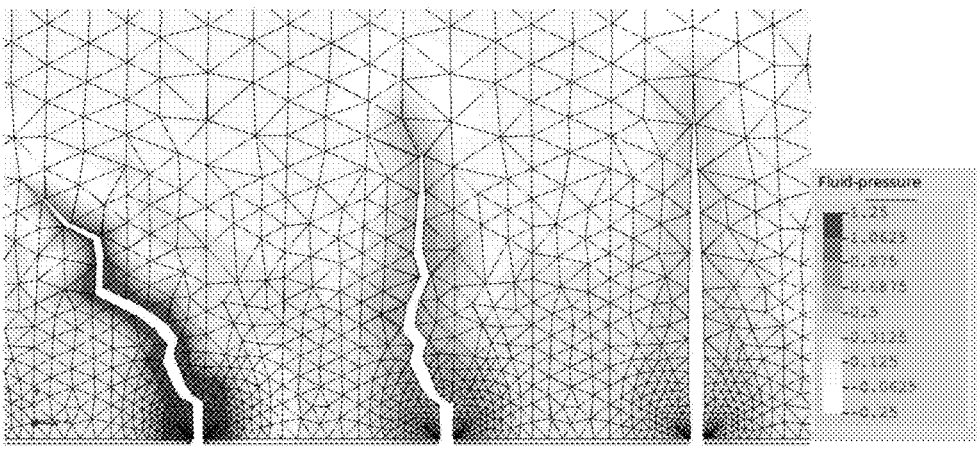
FIG. 19 This figure shows the fracture opening and fluid pressure distributions at the end of the third injection stage.

FIGS. 17, 18 and 19 depict the fracture openings and fluid pressure distributions at the end of each of the three injections, showing clearly how the presence of the first crack perturbs the path of the second (which turns out a little off to the left from the straight path that would have taken place in the absence of the first fracture), and the presence of the first two affects even more the path of the third one, which clearly deviates to the left at almost 45 degrees.

The invention claimed is:

1. A method implemented in a computer for numerically simulating a behavior of a porous medium in a hydrocarbon reservoir under applied load simulations, the method comprising the following steps:
    defining a domain;
    creating a numerical mesh on the domain to generate a geomechanical model and a fluid model of the porous medium with standard finite elements that delimit boundaries of the domain, and wherein edges of the mesh follow at least the boundaries of the domain, pre-existing fracture contours, or both, and wherein creating the numerical mesh includes:
        inserting zero-thickness interface elements along pre-existing fracture paths,
        locating surfaces extending along finite element boundaries that define potential propagation paths for fractures; and
        inserting zero-thickness interface elements at a mid-plane along each of the potential propagation paths;
    populating the numerical mesh elements with mechanical properties, at least elastic properties; and flow properties, at least permeability properties, the populated numerical mesh forming the geomechanical and fluid flow models;
    populating the numerical mesh elements with initial stress and initial fluid pressure values;
    assigning boundary conditions;
    assembling a system of equations; and
    simulating fractures, and the propagation of fractures, in the porous medium by solving an evolution in time for a coupled solution of the fluid-flow model and the geomechanical model;
    wherein the geomechanical model for each of the zero-thickness elements is formulated in terms of:
        a total stress vector $\sigma_{mp}=(\sigma_n,\tau_{l1},\tau_{l2})$ at the fracture mid-plane where (n,l1,l2) is an orthogonal reference system with l1 and l2 aligned with the fracture mid-plane and n its normal;
        a displacement vector $\hat{u}=(u_n,v_{l1},v_{l2})$ defined as the relative displacement of two faced points in the zero-thickness elements located in the fracture, a hyperbolic failure surface $F(\sigma_n,\tau)$ being $$\tau = \sqrt{\tau_{l1}^2 + \tau_{l2}^2}$$

defining the yield surface; wherein the F=0 condition results in a hyperbolic curve in the σ-τ plane, $F=\tau^2-\tan^2 \varphi)(\sigma^2-2a\sigma)=0$ having two asymptotes intersecting with angle φ in respect to the σ axis in point a for τ=0;

wherein given the $\tau_{t1}{}^n$ and $\tau_{t1}{}^n$ values in a predetermined time step n, the and $\tau_{t1}{}^{n+1}$ and $\tau_{t2}{}^{n+1}$ values in the next time step n+1 are calculated as satisfying the following equation:

$$\tan\left(\frac{\beta-\lambda}{2}\right) = \tan\left(\frac{\beta-\lambda_0}{2}\right)\left(\frac{\tau+\sqrt{\tau^2+a^2\tan^2\phi}}{\tau_0+\sqrt{\tau_0^2+a^2\tan^2\phi}}\right)^{-\frac{K_t\Delta v}{K_n\Delta u_n\tan\phi}}$$

given that $\tau^2-\tan^2\varphi(\sigma^2-2a\sigma)=0$, wherein $\beta$ relates imposed tangential relative displacements $\Delta v_{t1}$ and $\Delta v_{t2}$, $K_n$, and $K_t$ are normal and shear stiffness moduli respectively, $\lambda_0$ is the ratio between $\tau_{t1}{}^n$ and $\tau_{t2}{}^n$; and, $\lambda$ is the ratio between $\tau_{t1}{}^{n+1}$ and $\tau_{t2}{}^{n+1}$.

2. The method according to claim 1, wherein after solving the evolution in time for a coupled solution of the fluid-flow model and the geomechanical model, the numerical mesh is remeshed according to displacements of the fractures to model the propagation of said fractures.

3. The method according to claim 1, wherein the domain comprises at least an injection borehole and wherein before assembling the system of equations the method comprises assigning loads according to injection conditions.

4. The method according to claim 1, wherein governing equations for the porous medium are:

$L_c^T\sigma+\rho g=0$     Equilibrium equation:

$\sigma'=\sigma+\alpha_c m_c p$     Effective stress principle:

$\sigma'=D_c\varepsilon$     Constitutive relationship:

$\varepsilon=L_c u$     Compatibility equation:

where $\sigma=\sigma=(\sigma_{11}, \sigma_{22}, \sigma_{33}, \sigma_{12}, \sigma_{13}, \sigma_{23})$ is a 6-component total stress vector, $$L_c = \begin{pmatrix} \frac{\partial}{\partial x_1} & 0 & 0 & 0 & \frac{\partial}{\partial x_3} & \frac{\partial}{\partial x_2} \\ 0 & \frac{\partial}{\partial x_2} & 0 & \frac{\partial}{\partial x_3} & 0 & \frac{\partial}{\partial x_1} \\ 0 & 0 & \frac{\partial}{\partial x_3} & \frac{\partial}{\partial x_2} & \frac{\partial}{\partial x_1} & 0 \end{pmatrix}^T$$

is a differential operator, g is a gravity vector, $\rho$ is a bulk or averaged density of the fluid-solid system, $\sigma'=(\sigma'_{11}, \sigma'_{22}, \sigma'_{33}, \sigma'_{12}, \sigma'_{13}, \sigma'_{23})$ is a 6-component effective stress vector, $\alpha_c$ is a Biot-Willis coefficient, $m_c$ is an equivalent to an identity tensor in this vector formulation, p is a pore fluid pressure, $D_c$ is a rock constitutive matrix according to elastic conditions, $\varepsilon$ is a strain vector, and u is a displacements vector;

governing equations for the fluid flow in the continuum medium are:

Continuity equation: $divq + \left(\frac{\alpha_c-\phi}{K_s} + \frac{\phi}{K_f}\right)\frac{\partial p}{\partial t} + \alpha_c\frac{\partial \varepsilon_v}{\partial t} = 0$ Darcy's law (general form): $q = -\frac{K_c}{\gamma_f}(gradp - \rho_f g)$ where q is a fluid flux, $K_s$ is a solid bulk modulus, $K_f$ is a fluid bulk modulus, $\emptyset$ is porosity, $\varepsilon_v$ is a volumetric strain, $K_c$ is a rock hydraulic conductivity tensor, $\gamma_f$ is a fluid specific weight; and $\rho_f$ is a fluid density, equations governing mechanical behavior of fractures are posed at the fracture mid-plane and in a reference system aligned with the fracture mid-plane:

$\sigma'_{mp}=\sigma_{mp}+\alpha_f m_{mp} p_{mp}$     Effective stress principle:

$d\sigma'_{mp}=D_{mp}d\hat{u}$     Constitutive relationship:

$d\hat{u}=L_{mp}du$     Compatibility equation:

where $\sigma'_{mp}$ is an effective stress vector at the fracture mid-plane, $\alpha_f$ is a fracture Biot's coefficient, $m_{mp}$ is fluid pressure in a direction normal to a discontinuity axis, $p_{mp}$ is a fluid pressure at the mid-plane of the fracture, $\hat{u}$ is a relative displacement vector, and $L_{mp}$ is an operator that relates the relative displacement vector to an actual displacement at the faces of the fracture.

5. The method according to claim 4, wherein the equations governing the fluid flow along the fracture are posed at the fracture mid-plane and in a reference system aligned with the fracture mid-plane:

Continuity equation: $divQ_l + \frac{1}{M_f}\frac{\partial p_{mp}}{\partial t} + \alpha_f\frac{\partial u_n}{\partial t} = 0$ Darcy's law: $Q_l = -T_l grad\left|_f\left(\frac{p_{mp}}{\gamma_f} + z\right)\right.$ Transversal flow: $q_t = K_t(p^{bot} - p^{top})$ where $u_n$ is the fracture aperture, $Q_l$ is a local flow rate vector along the fracture mid-plane, $\alpha_f$ and $M_f$ respectively are a fracture Biot's coefficient and modulus, $T_l$ is a mid-plane longitudinal transmissivity matrix, $q_t$ is a local flow rate vector transversal to the fracture mid-plane, $K_t$ is a transversal conductivity and $p^{bot}$ and $p^{top}$ are fluid pressures on each face of the fracture.

6. The method according to claim 4, wherein the rock hydraulic conductivity is defined according to the volumetric strain ($e_v$) as:

$$K_c = \left(\frac{K_i}{n_i^3}\frac{(e^{\varepsilon_v}-(1-n_i))^3}{e^{\varepsilon_v}}\right)I$$

where $K_i$ is an initial hydraulic conductivity, $n_i$ is an initial porosity, and I an identity matrix.

7. The method according to claim 5, wherein the transmissivity along the fracture mid-plane is a cubic law where $T_l$ is proportional to the cube of the aperture $u_n{}^3$.

8. The method according claim 1, wherein a region of the domain is populated with surfaces discretized using zero-thickness interface elements extending along the finite elements boundaries.

9. The method according to claim 8, wherein the region of the domain populated with surfaces discretized using zero-thickness interface elements extending along the finite elements boundaries is the whole domain.

10. An electronic device for processing data, the device comprising a processor and a non-transitory memory storing instructions which, when executed by the processor, cause the processor to carry out the method for simulating the behavior of a porous medium according to claim 1.

11. A computer program product adapted to perform a method according to claim 1.

12. The method according to claim 3, wherein injection conditions include a flow-rate or fluid pressure.

* * * * *